Feb. 8, 1938.  G. WUNSCH ET AL  2,107,971
JET PIPE RELAY
Filed July 29, 1936
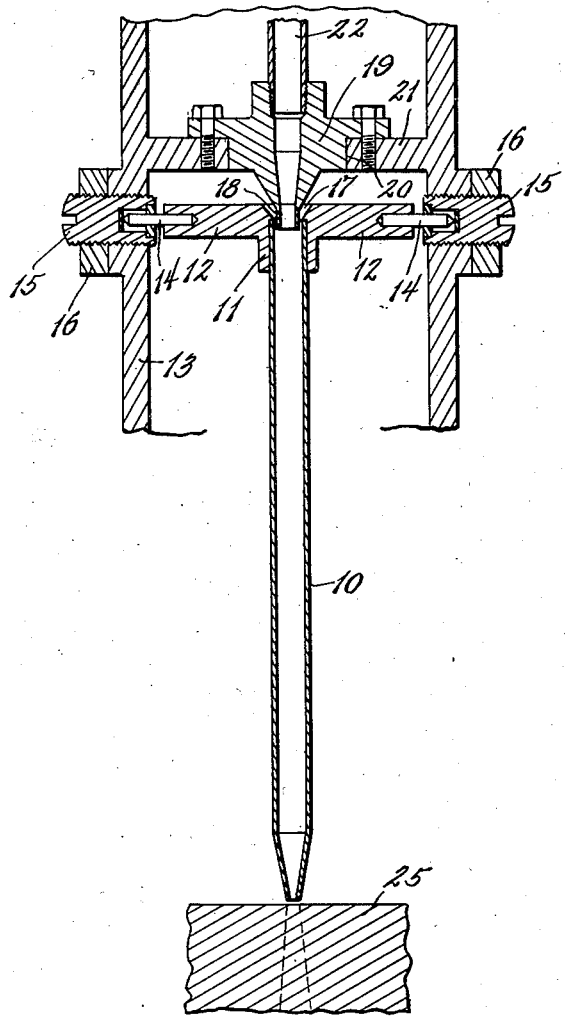
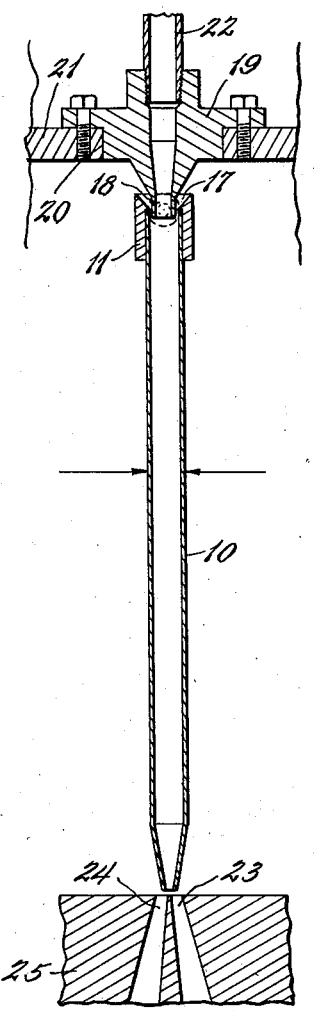
Inventor
Guido Wunsch and
Walter Hartung
By A. D. Adams
Attorney Patented Feb. 8, 1938

2,107,971

UNITED STATES PATENT OFFICE 2,107,971

JET PIPE RELAY

Guido Wunsch and Walter Hartung, Berlin-Steglitz, Germany, assignors to Askania-Werke A. G. vormals Central Werkstatt Dessau und Carl Bamberg-Friedenau, a company of Germany Application July 29, 1936, Serial No. 93,306
In Germany November 30, 1935

4 Claims. (Cl. 299—73)

This invention relates to jet pipe relay systems for controlling physical conditions and, among other objects, aims to provide a greatly improved pivoted jet pipe assembly which eliminates thrust on and the resulting friction in the pivot bearings and reduces the pressure losses of the fluid entering the pivoted end of the jet pipe to a minimum. Also, the invention aims to provide a relatively simple, reliable and compact relay unit wherein the jet pipe may be mounted to oscillate on a horizontal axis or with its axis of rotation in a horizontal plane. The idea is to increase the sensitivity and efficiency of the well known "Askania" jet pipe regulators.

Other aims and advantages of the invention will appear in the specification, when considered in connection with the accompanying drawing, wherein:

Fig. 1 is a vertical sectional view of a jet pipe relay embodying the invention; and Fig. 2 is a similar sectional view taken at right angles to Fig. 1.

In the present designs of pivoted jet pipe relays, the operating fluid is usually supplied to the jet pipe through a right angle bend or special fitting in the fulcrum of the jet pipe and flows in the direction of its axis of oscillation. The change in direction of flow causes the fluid to lose some of its pressure. Moreover, the friction on the pivot bearings is increased due to thrust of the jet pipe. This invention aims to eliminate these difficulties and to improve and simplify the design of the jet pipe system.

In accordance with this invention, the jet pipe 10 is a straight tube having an open inlet end and is shown as being secured to a support 11 having trunnion arms 12 pivoted on a horizontal axis in a regulator casing 13. In this example, the trunnions carry pivot pins 14 mounted in adjustable screw plug bearings 15 extending through opposite sides of the casing and held in adjusted positions by jamb nuts 16. The pin bearings are preferred to reduce friction, but other types of bearings may be employed.

The open inlet end of the jet pipe is shown as being located on the axis of oscillation and the trunnion support 11 has a funnel shaped inlet 17 above the end of the jet pipe through which a fixed nozzle 18 projects into the tube. The nozzle is shown as being integral with a flanged fitting 19 bolted in a central opening 20 of a web 21 across the casing 13 so that the nozzle is axially alined with the tube. The arrangement is such that the nozzle can be removed or inserted without disturbing its alinement with the jet pipe. A pressure fluid conduit or pipe 22 is connected to the upper end of the nozzle fitting and is coaxial with the nozzle conduit and the jet pipe to deliver fluid straight into the jet pipe.

Since the pivotal or angular movement of the jet pipe is slight because its nozzle swings back and forth across the adjacent orifices of control conduits 23 and 24 in a distributor block 25, the supply nozzle 18 may fit fairly closely in the open upper end of the tube. The slight play or clearance required to permit this movement will not result in any appreciable loss of pressure due to leakage.

From the foregoing description, it will be seen that the pressure fluid enters straight into the jet pipe without imparting any thrust to its pivot bearings and that the pressure loss through the inlet end is reduced to a minimum. Further, the arrangement eliminates destructive wear on the pivot bearings and the design is more compact. Moreover, the jet pipe system is far more sensitive to control impulses.

Obviously, the present invention is not restricted to the particular embodiment thereof herein shown and described.

What is claimed is:

1. A jet pipe relay comprising, in combination, a jet pipe pivotally mounted on a horizontal axis and having an open inlet end the axis of which is substantially in line with the longitudinal axis of the jet pipe; and a fixed fluid supplying nozzle projecting slightly into and loosely fitted within the open end of the jet pipe providing sufficient clearance to permit free pivotal movement of the jet pipe.

2. A jet pipe relay comprising, in combination, a jet pipe pivoted to swing about a horizontal axis and having an open inlet end substantially in the plane of the axis; a stationary fitting having a nozzle projecting a short distance into and loosely fitted within the open end of the jet pipe to discharge pressure fluid substantially axially into the jet pipe; and a pressure fluid conduit connected to said fitting substantially coaxial with the jet pipe.

3. A jet pipe relay comprising, in combination, a substantially straight jet pipe having an open inlet end; a trunnioned support carrying said jet pipe; adjustable pivot bearings for said trunnioned support; a relatively fixed nozzle projecting into the pivoted inlet end of said jet pipe; and a pressure fluid conduit connected to said nozzle.

4. A jet pipe relay comprising, in combination, a casing, a trunnioned support pivotally mounted within the casing on a horizontal axis; adjustable bearing members in the casing; a jet pipe secured to said support having an open end terminating substantially on the pivotal axis; a web extending across the casing having a central opening axially alined with the jet pipe; a fitting centered in said opening having a nozzle projecting into the open end of said jet pipe to discharge pressure fluid axially therein; and a pressure fluid conduit connected to said fitting.

GUIDO WUNSCH.
WALTER HARTUNG.